United States Patent [19]

Giorgetti et al.

[11] Patent Number: 4,865,167
[45] Date of Patent: Sep. 12, 1989

[54] SELF-VENTILATING DISK FOR DISK BRAKES

[75] Inventors: Alberto Giorgetti, Terno D'Isola; Giovanni Gotti, Alme', both of Italy

[73] Assignee: Brembo S.p.A., Paladina, Italy

[21] Appl. No.: 63,447

[22] Filed: Jun. 18, 1987

[30] Foreign Application Priority Data

Jun. 20, 1986 [IT] Italy .................... 22342/86[U]

[51] Int. Cl.$^4$ ............................. F16D 65/847
[52] U.S. Cl. ....................... 188/218 XL; 188/71.6
[58] Field of Search ............. 188/58, 71.6, 73.1, 188/218 R, 218 XL; 192/107 R

[56] References Cited

FOREIGN PATENT DOCUMENTS 0077433 4/1983 European Pat. Off. ..... 188/218 XL
3527577 2/1987 Fed. Rep. of Germany ...... 188/218 XL Primary Examiner—Duane A. Reger
Attorney, Agent, or Firm—Saidman, Sterne, Kessler & Goldstein

[57] ABSTRACT

A disk for use with disk brakes, which can perform in a vibration-free manner with uniform heating, comprises a braking band formed by two annular rings in mutually spaced apart relationship and interconnected by small heat radiating pillars distributed in between the rings according to a quincunx type of arrangement.

5 Claims, 1 Drawing Sheet

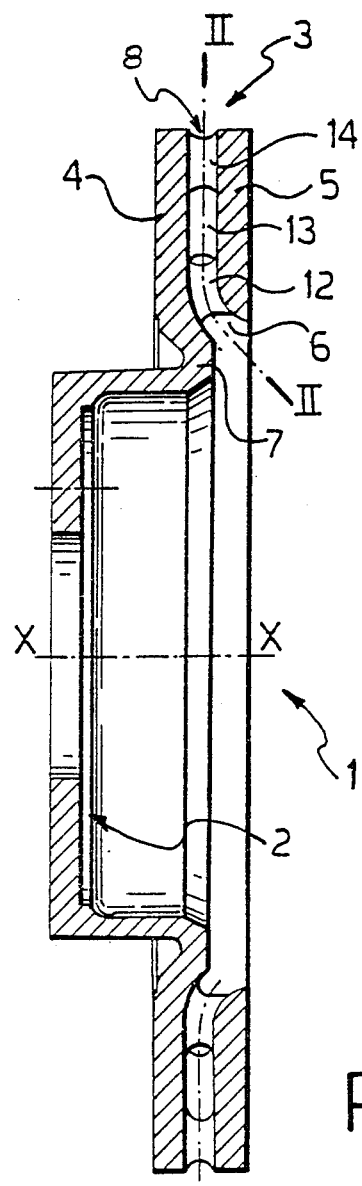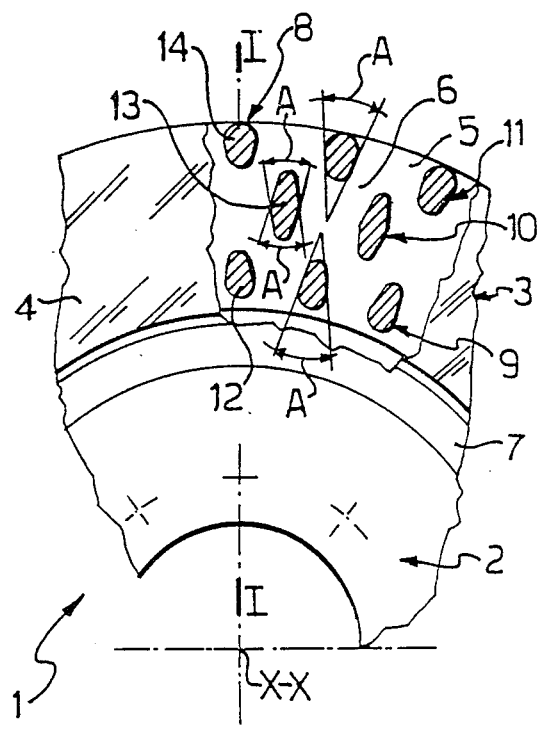
Fig-1
Fig-2

SELF-VENTILATING DISK FOR DISK BRAKES

DESCRIPTION

This invention relates to a disk, for use with disk brakes, of a type which comprises a braking band formed by two mutually spaced apart annular rings interconnected by heat radiating elements extending between the annular rings to dissipate heat generated by the braking action.

As is known, brake disks of this kind have applications to disk brakes which equip high performance motorcars, in particular motorcars with a high top speed. Owing to centrifugal force, a ventilating airflow is established across such brake discs along a path through the interspace separating the annular rings of the braking band. Thus, the heat radiating elements formed between the rings are swept by the airflow and can transfer to the ambient heat generated at the braking band each time that the brake is applied.

Prior brake disks, as employed heretofore, included heat radiating elements in the form of radially extending fins of small thickness between the rings. Such prior disk designs can substantially achieve their objective and are in many ways advantageous. They are relatively easy to manufacture, for instance, However, a problem which they pose on the occasion of prolonged application of the brake is a tapering effectiveness of the braking action. In fact, consequently to prolonged brake application, the working surface of the braking band is apt to lose its uniformity and develop alternating burnished and dull areas which set in with the same pitch as the fin pitch, the burnished areas appearing at the fin locations and the dull areas in between the fin locations. A higher temperature is reached in the dull areas, and material deposits from the brake liners build up thereon.

Another problem is that the brake disk may start vibrating due to non-uniform frictional coefficient as brought about by that alternating burnished and dull areas.

A further drawback of conventional brake disks is that there are formed, in the braking band region, micro-cracks due to unevenness of the temperature reached around the braking band.

Suggestions have been made for brake discs wherein the fins are set at an angle to the radial direction, and preferably curved or acuate. That approach has alleviated the problems mentioned above somewhat but rendered the disk more difficult to manufacture.

It is an object of this invention to provide a brake disk of the kind specified above, which has such constructional and performance features as to overcome the above-mentioned problems affecting the prior art.

This object is achieved by a brake disk as indicated being characterized in that said heat radiating elements are small pillars distributed in between the annular rings.

Advantageously, moreover, such small pillars would be distributed according to a quincunx layout.

Further features and the advantages of the inventive brake disk will become more clearly apparent from the following description of a preferred embodiment of this invention, given herein by way of illustration and not of limitation with reference to the accompanying drawing, where:

FIG. 1 shows a sectional view of the brake disk according to this invention, taken along the line I—I; and FIG. 2 is a sectional detail view of the brake disk shown in FIG. 1, taken along the line II—II.

With reference to the drawing figures, a disk 1 for a disk-type brake intended for high performance motor cars and being of the so-called self-ventilating type, has an axis X—X and comprises a hub 2 and a braking band 3.

The hub 2 and braking band 3 are coaxial with each other, and formed preferably as one piece by casting from an appropriate material such as cast iron.

The braking band 3 is formed by two annular rings 4 and 5, also referred to as "webs", having substantially the same thickness dimension, said rings 4 and 5 being set mutually apart. More specifically, the annular rings 4 and 5 are placed at a preset distance from each other equal approximately to the ring thickness dimension.

On the brake disk 1, the braking band 3 is connected to the hub 2 by an annular connective portion 7 having a substantially semicircular cross-sectional shape and extending between the hub 2 and the ring 4, it being formed by casting.

The ring 4 and ring 5 are interconnected by heat radiating elements 8 which extends from one ring to the other through the ring interspace 6 and are formed by casting.

The heat radiating elements 8 are in the form of small pillars distributed at regular intervals between the rings according to a substantially quincunx type of arrangement.

In a preferred embodiment of the invention, the pillars would be arranged in three concentrical circular tiers about an axis X—X, respectively an inboard tier 9, intermediate tier 10, and outboard tier 11.

Within each of the tiers 9, 10 and 11, the pillars are set at pitch distances, with each tier offset from the next.

The pillars of the inboard circular tier 9, collectively denoted by the reference numeral 12, have a substantially outward tapering oval cross-sectional shape.

The pillars of the intermediate circular tier 10, collectively designated 13, have a substantially radially tapering diamond cross-sectional shaped.

The pillars of the outboard circular tier 11, collectively indicated at 14, have a substantially oval cross-sectional shape similar to that of the pillars 12, but taper inwardly.

The substantially oval cross-sections of the pillars 12 and 14, and the substantially rhombic cross-section of the pillars 13, have a taper angle A selected in the 25° to 36° range, and preferably equal to 30° C.

In operation, the ventilating airflow generated by centrifugal force is will be directed to flow through the interspace 6, from the inside toward the outside of the disk, and sweep past the pillars 12,13 and 14, which are effective to dissipate heat being generated in the annular rings as the brake is applied.

The brake disk of this invention has shown in practice capable of providing superior effectiveness of the braking action, even in conditions of severe and prolonged application. Indeed, by virtue of the distribution and configuration provided for the heat radiating elements between the annular rings, the latter become heated uniformly and attain lower temperature peaks. It should be also noted that the pillars collectively afford increased overall surface area of heat transfer.

The inventive brake disk has also shown that it is advantageous in that a smooth, wholly vibration-free performance is ensured of the brake.

A not least advantage of the brake disk according to the invention is that it has proved easier to form by casting.

Understandably, many modifications and changes may be made to the brake disk described above by a skilled person in order to meet specific contingent requirements, without departing from the protection scope of this invention as set forth in the appended claims.

I claim:

1. A disk for use with disk brakes, comprising: a braking band region formed by two mutually spaced apart annular rings interconnected by heat radiating elements extending between the annular rings to dissipate heat generated by the braking action, wherein said heat radiating elements are in the form of small pillars arranged in concentric circumferential tiers with each tier being offset from the next, according to a quincunx type pillar arrangement, said tiers being three in number and including an inboard tier, an intermediate tier and an outboard tier, the pillars in the inboard and outboard tiers having a substantially oval cross-sectional shape and the pillars in the intermediate tier having a substantially rhombic cross-sectional shape, the substantially oval cross-sections of the pillars in the inboard and outboard tiers tapering outwardly and inwardly respectively, and the substantially rhombic cross sections of pillars in the intermediate tier tapering in a radial direction.

2. A disk according to claim 1, characterized in that the substantially oval cross-sections of the pillars in the inboard and outboard tier and the substantially rhombic cross-sections of the pillars in the intermediate tier have a taper angle in the 25° to 35° range.

3. A disk according to claim 2, characterized in that said taper angle is 30°.

4. A disk for use with disk brakes, comprising: a braking band region formed by two mutually spaced apart annular rings interconnected by heat radiating elements extending between the annular rings to dissipate heat generated by the braking action, wherein said heat radiating elements are in the form of small pillars distributed in substantially a quincux arrangement, and wherein said heat radiating elements have cross sections which are tapered along a line which is substantially radial direction and arranged in concentrical circumferential tiers with each tier being offset from the next, wherein there are three tiers, respectively an inboard tier, intermediate tier, and outboard tier, and the pillars in the inboard and outboard tiers have a substantially oval cross-sectional shape and the pillars in the intermediate tier have a substantially diamond cross-sectional shape.

5. A disk according to claim 4, wherein the substantially oval cross-sections of the pillars in the inboard and outboard tiers taper outwardly and inwardly, respectively.

* * * * *

UNITED STATES PATENT AND TRADEMARK OFFICE
CERTIFICATE OF CORRECTION

PATENT NO. : 4,865,167

DATED : September 12, 1989

INVENTOR(S) : Alberto Giorgetti, et al.

It is certified that error appears in the above-identified patent and that said Letters Patent is hereby corrected as shown below:

Column 1, line 27, after "instance", delete "," and insert --.-- therefor;

line 49, delete "acuate" and insert --arcuate-- therefor;

Column 2, line 44, delete "shaped" and insert --shape-- therefor;

line 52, after "30°", delete "C";

Column 4, line 8, delete "2" and insert --1-- therefor; and line 17, delete "quincux" and insert --quincunx-- therefor.

Signed and Sealed this

Thirty-first Day of July, 1990

Attest:

HARRY F. MANBECK, JR.

*Attesting Officer*      *Commissioner of Patents and Trademarks*